US011014796B2

(12) United States Patent
Bafile et al.

(10) Patent No.: US 11,014,796 B2
(45) Date of Patent: May 25, 2021

(54) SCISSOR LIFT LOAD SENSING SYSTEMS AND METHODS

(71) Applicant: Oshkosh Corporation, Oshkosh, WI (US)

(72) Inventors: Louis Bafile, Oshkosh, WI (US); David Lombardo, Oshkosh, WI (US); Jihong Hao, Greencastle, PA (US); Brendan Kotlanger, Oshkosh, WI (US); Paul Acuri, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 16/811,196

(22) Filed: Mar. 6, 2020

(65) Prior Publication Data
US 2020/0317491 A1 Oct. 8, 2020

Related U.S. Application Data

(60) Provisional application No. 62/829,837, filed on Apr. 5, 2019.

(51) Int. Cl.
*B66F 17/00* (2006.01)
*B66F 7/06* (2006.01)
(Continued)

(52) U.S. Cl.
CPC .......... *B66F 17/006* (2013.01); *B66F 7/0625* (2013.01); *B66F 7/0666* (2013.01);
(Continued)

(58) Field of Classification Search
CPC ........ B66F 11/00; B66F 11/04; B66F 11/042; B66F 7/06; B66F 7/065; B66F 7/0658; B66F 7/0666; G01L 1/005; G01G 19/08
See application file for complete search history.

(56) References Cited

U.S. PATENT DOCUMENTS 3,596,735 A * 8/1971 Denier ................. B66F 11/042
182/16
6,286,629 B1 * 9/2001 Saunders .............. B66B 9/0853
187/394
(Continued)

FOREIGN PATENT DOCUMENTS

CN 203006872 U 6/2013
DE 91 02 098 U1 6/1992
(Continued)

OTHER PUBLICATIONS

International Search Report and Written Opinion regarding Appl. No. PCT PCT/US2020/021351, dated Sep. 29, 2020, 21 pps.
(Continued)

*Primary Examiner* — Tyrone V Hall, Jr.
(74) *Attorney, Agent, or Firm* — Foley & Lardner LLP

(57) ABSTRACT

A lift device includes a base, a retractable lift mechanism, a work platform, and a lift controller. The retractable lift mechanism is moveable between an extended position and a retracted position. The work platform is configured to support a load and is coupled to and supported by the retractable lift mechanism. The linear actuator is configured to selectively move the retractable lift mechanism between the extended position and the retracted position. The linear actuator has an electric motor and an electromagnetic brake. The lift controller is in communication with the linear actuator and is configured to determine the load supported by the work platform based on the actuator force applied to the work platform and the height of the work platform.

13 Claims, 9 Drawing Sheets

(51) Int. Cl.
*B66F 11/04* (2006.01)
*G01L 1/00* (2006.01)

(52) U.S. Cl.
CPC .......... *B66F 11/042* (2013.01); *B66F 11/044* (2013.01); *G01L 1/005* (2013.01)

(56) References Cited

U.S. PATENT DOCUMENTS

| | | | |
|---|---|---|---|
| 9,776,846 | B2 | 10/2017 | Ditty |
| 9,791,071 | B2 | 10/2017 | Ditty et al. |
| 10,065,843 | B2 * | 9/2018 | Ahern .................. B66F 11/042 |
| 10,174,868 | B2 | 1/2019 | Ditty et al. |
| 10,336,596 | B2 | 7/2019 | Puszkiewicz et al. |
| 10,357,995 | B2 | 7/2019 | Palmer et al. |
| 10,472,889 | B1 | 11/2019 | Betz |
| 10,479,664 | B2 | 11/2019 | Linsmeier et al. |
| 10,611,347 | B1 | 4/2020 | Archer et al. |
| 10,617,900 | B1 | 4/2020 | Linsmeier et al. |
| 10,829,355 | B2 | 11/2020 | Puszkiewicz et al. |
| 2011/0060488 | A1 * | 3/2011 | Nakazawa ................ B66F 9/20 701/22 |
| 2016/0297643 | A1 * | 10/2016 | Lowe ...................... F15B 15/26 |
| 2017/0253283 | A1 * | 9/2017 | Eidelson .............. B62D 51/001 |
| 2018/0148308 | A1 * | 5/2018 | Yin ........................ B66F 17/00 |
| 2019/0137006 | A1 | 5/2019 | Ditty et al. |
| 2019/0359460 | A1 | 11/2019 | Linsmeier et al. |
| 2020/0071996 | A1 | 3/2020 | Betz |
| 2020/0139804 | A1 | 5/2020 | Holmes et al. |
| 2020/0140248 | A1 | 5/2020 | Hackenberg et al. |
| 2020/0140249 | A1 | 5/2020 | Hackenberg et al. |
| 2020/0231131 | A1 | 7/2020 | Archer et al. |
| 2020/0238115 | A1 | 7/2020 | Linsmeier et al. |
| 2020/0290853 | A1 | 9/2020 | Neubauer et al. |
| 2020/0290855 | A1 | 9/2020 | Bruno et al. |
| 2020/0317065 | A1 | 10/2020 | Lombardo |
| 2020/0317256 | A1 | 10/2020 | Hao et al. |
| 2020/0317486 | A1 | 10/2020 | Puszkiewicz et al. |
| 2020/0317488 | A1 | 10/2020 | Bafile et al. |
| 2020/0317489 | A1 | 10/2020 | Bhatia et al. |
| 2020/0317491 | A1 | 10/2020 | Bafile et al. |
| 2020/0317492 | A1 | 10/2020 | Bhatia et al. |
| 2020/0317493 | A1 | 10/2020 | Lombardo et al. |
| 2020/0317494 | A1 | 10/2020 | Bafile et al. |

FOREIGN PATENT DOCUMENTS

| | | |
|---|---|---|
| JP | 2007-099439 | 4/2007 |
| JP | 4456199 | 4/2010 |

OTHER PUBLICATIONS

MHA Products, Lifting & Elevating Equipment, Oct. 30, 2018, 49 pps.

Spackman, H. M., Mathematical Analysis of Scissor Lifts, Naval Ocean Systems Center, San Diego, CA, Jun. 30, 1989, 67 pps.

\* cited by examiner

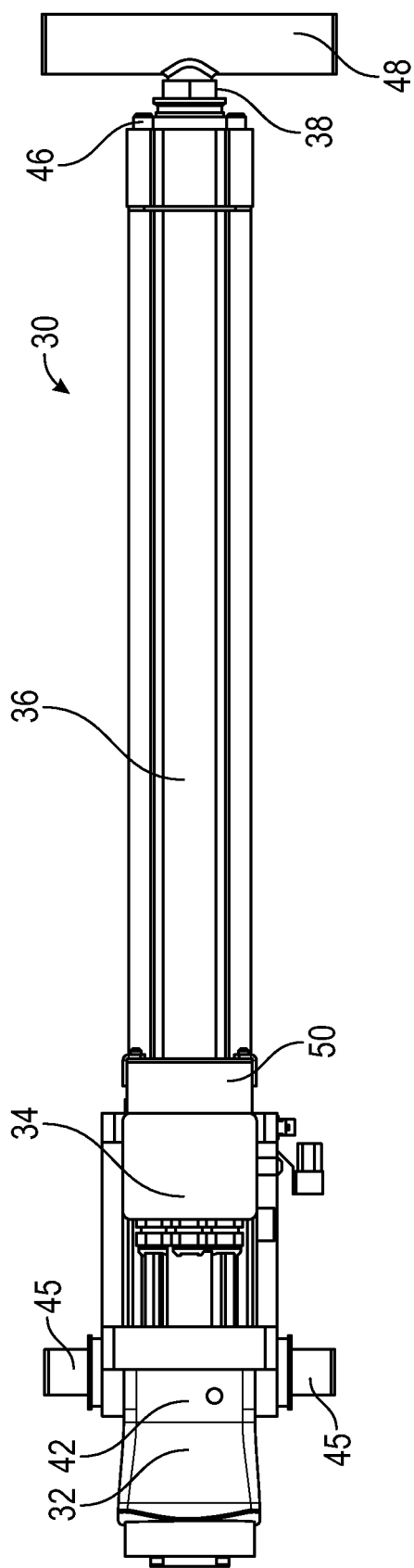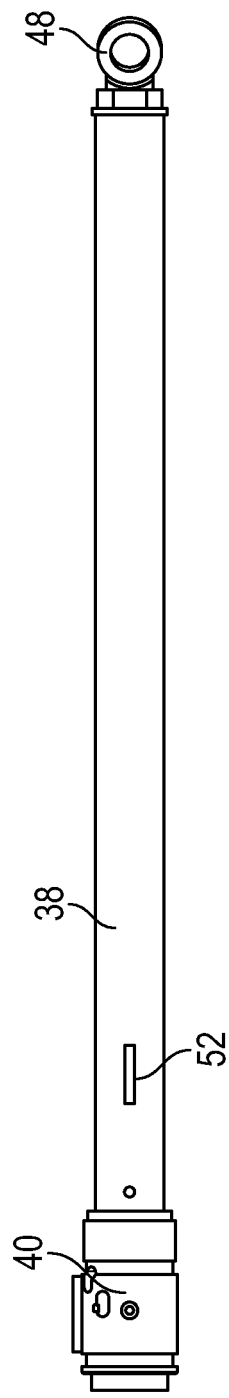
FIG. 5
FIG. 6

SCISSOR LIFT LOAD SENSING SYSTEMS AND METHODS

CROSS-REFERENCE TO RELATED APPLICATION

This application claims the benefit of U.S. Provisional Application No. 62/829,837, filed Apr. 5, 2019, which is incorporated herein by reference in its entirety.

BACKGROUND

Lift devices commonly include a vertically movable platform that is supported by a foldable series of linked supports. The linked supports are arranged in an "X" pattern, crisscrossing with one another. A hydraulic cylinder generally controls vertical movement of the platform by engaging and rotating (i.e., unfolding) the lowermost set of linked supports, which in turn unfolds the remainder of the series of linked supports within the system. The platform raises and lowers based upon the degree of actuation by the hydraulic cylinder. A hydraulic cylinder may also control various other vehicle actions, such as, for example, steering or platform tilt functions. Lift devices using one or more hydraulic cylinders require an on-board reservoir tank to store hydraulic fluid for the lifting process.

SUMMARY

One exemplary embodiment relates to a method for determining a load supported by a work platform of a lift device. The method comprises providing the lift device including the work platform and a linear actuator configured to support and selectively move the work platform between a raised and a lowered position, the linear actuator having an electric motor and an electromagnetic brake. The method further comprises disengaging the electromagnetic brake of the linear actuator. The method further comprises maintaining a height of the work platform using the electric motor of the linear actuator. The method further comprises determining a motor torque applied by the electric motor. The method further comprises determining an actuator force applied by the linear actuator to the work platform based on the motor torque applied by the electric motor. The method further comprises determining the height of the work platform. The method further comprises determining the load supported by the work platform based on the actuator force applied to the work platform and the height of the work platform.

Another exemplary embodiment relates to a lift device. The lift device comprises a base, a retractable lift mechanism, a work platform, a linear actuator, and a lift controller. The base has a plurality of wheels. The retractable lift mechanism has a first end coupled to the base and is moveable between an extended position and a retracted position. The work platform is configured to support a load. The work platform is coupled to and supported by a second end of the retractable lift mechanism. The linear actuator is configured to selectively move the retractable lift mechanism between the extended position and the retracted position. The linear actuator has an electric motor and an electromagnetic brake. The electromagnetic brake is configured to, when engaged, prevent the linear actuator from moving the retractable lift mechanism between the extended position and the retracted position. The lift controller is in communication with the linear actuator and includes a processing circuit having a processor and a memory. The memory has instructions configured to, when executed by the processor, cause the lift controller to disengage the electromagnetic brake. The instructions are further configured to, when executed by the processor, cause the lift controller to maintain a height of the work platform using the electric motor. The instructions are further configured to, when executed by the processor, cause the lift controller to determine a motor torque applied by the electric motor. The instructions are further configured to, when executed by the processor, cause the lift controller to determine an actuator force applied to the work platform based on the motor torque applied by the electric motor. The instructions are further configured to, when executed by the processor, cause the lift controller to determine the height of the work platform. The instructions are further configured to, when executed by the processor, cause the lift controller to determine the load supported by the work platform based on the actuator force applied to the work platform and the height of the work platform.

Another exemplary embodiment relates to a fully-electric scissor lift. The fully-electric scissor lift comprises a base, a scissor lift mechanism, a work platform, a linear actuator, and a lift controller. The base has a plurality of wheels. The scissor lift mechanism has a first end coupled to the base and is moveable between an extended position and a retracted position. The work platform is configured to support a load. The work platform is coupled to and supported by a second end of the scissor lift mechanism. The linear actuator is configured to selectively move the scissor lift mechanism between the extended position and the retracted position. The linear actuator has an electric motor, an electromagnetic brake, and a push tube assembly. The electromagnetic brake is configured to, when engaged, prevent the linear actuator from moving the scissor lift mechanism between the extended position and the retracted position. The push tube assembly has a protective outer tube and an inner push tube. The inner push tube includes a strain gauge configured to monitor a compression of the inner push tube. The lift controller is in communication with the linear actuator and includes a processing circuit having a processor and a memory. The memory has instructions configured to, when executed by the processor, cause the lift controller to disengage the electromagnetic brake. The instructions are further configured to, when executed by the processor, cause the lift controller to maintain a height of the work platform using the electric motor. The instructions are further configured to, when executed by the processor, cause the lift controller to determine a motor torque applied by the electric motor. The instructions are further configured to, when executed by the processor, cause the lift controller to determine an actuator force applied to the work platform based on the motor torque applied by the electric motor. The instructions are further configured to, when executed by the processor, cause the lift controller to determine the height of the work platform. The instructions are further configured to, when executed by the processor, cause the lift controller to determine the load supported by the work platform based on the actuator force applied to the work platform, the monitored compression of the inner push tube, and the height of the work platform.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which:

FIG. 5 is a bottom view of the linear actuator of FIG. 4;

FIG. 6 is a side view of a push tube and a nut assembly of the linear actuator of FIG. 4;

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, the various exemplary embodiments disclosed herein relate to systems, apparatuses, and methods for sensing a load supported by a work platform. In some embodiments, an electromagnetic brake of a lift actuator motor may be disengaged and the lift actuator motor may be used to maintain a work platform height. A lift controller may then be configured to determine the load supported by the work platform using various actuator/motor characteristics and a measured height of the work platform.

Figure 1A:
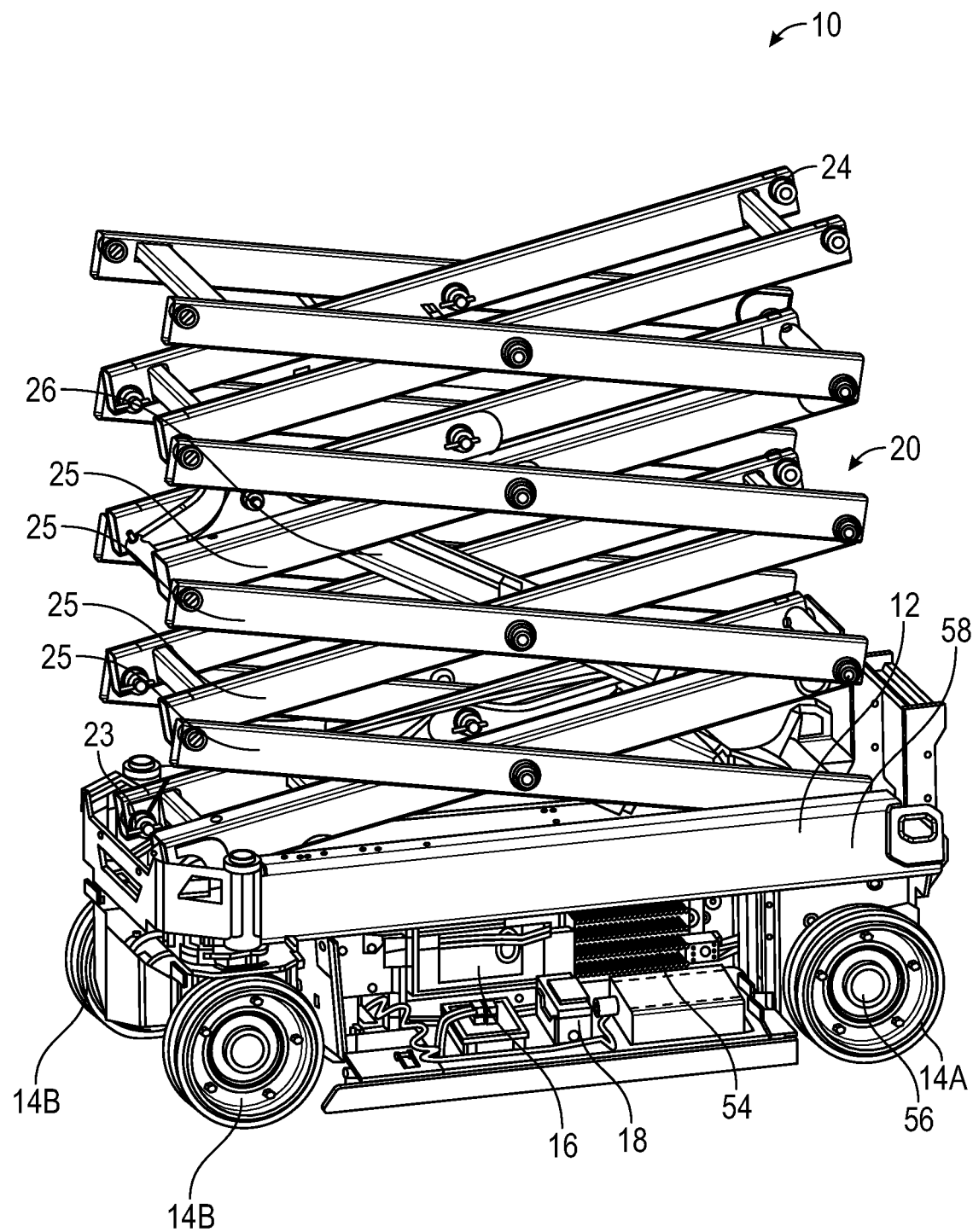
FIG. 1A is a side perspective view of a lift device in the form of a scissor lift, according to an exemplary embodiment.
Figure 1B:
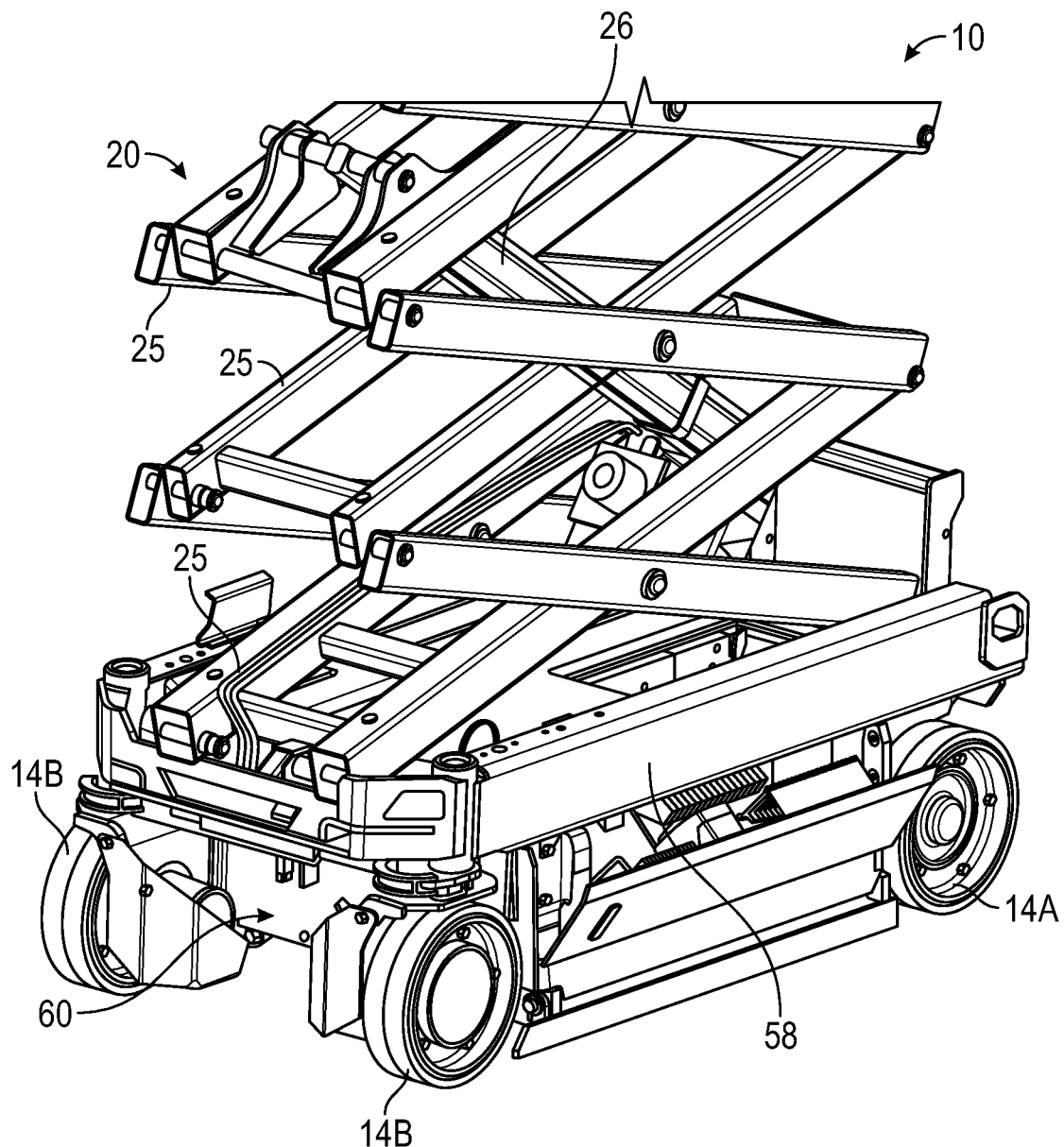
FIG. 1B is another side perspective view of the lift device of FIG. 1A.

According to the exemplary embodiment depicted in FIGS. 1A and 1B, a vehicle, shown as vehicle 10, is illustrated. The vehicle 10 may be a scissor lift, for example, which can be used to perform a variety of different tasks at various elevations. The vehicle 10 includes a base 12 supported by wheels 14A, 14B positioned about the base 12. The vehicle 10 further includes a battery 16 positioned on board the base 12 of the vehicle 10 to supply electrical power to various operating systems present on the vehicle 10.

The battery 16 can be a rechargeable lithium-ion battery, for example, which is capable of supplying a direct current (DC) or alternating current (AC) to vehicle 10 controls, motors, actuators, and the like. The battery 16 can include at least one input 18 capable of receiving electrical current to recharge the battery 16. In some embodiments, the input 18 is a port capable of receiving a plug in electrical communication with an external power source, like a wall outlet. The battery 16 can be configured to receive and store electrical current from one of a traditional 120 V outlet, a 240 V outlet, a 480 V outlet, an electrical power generator, or another suitable electrical power source.

Figure 2A:
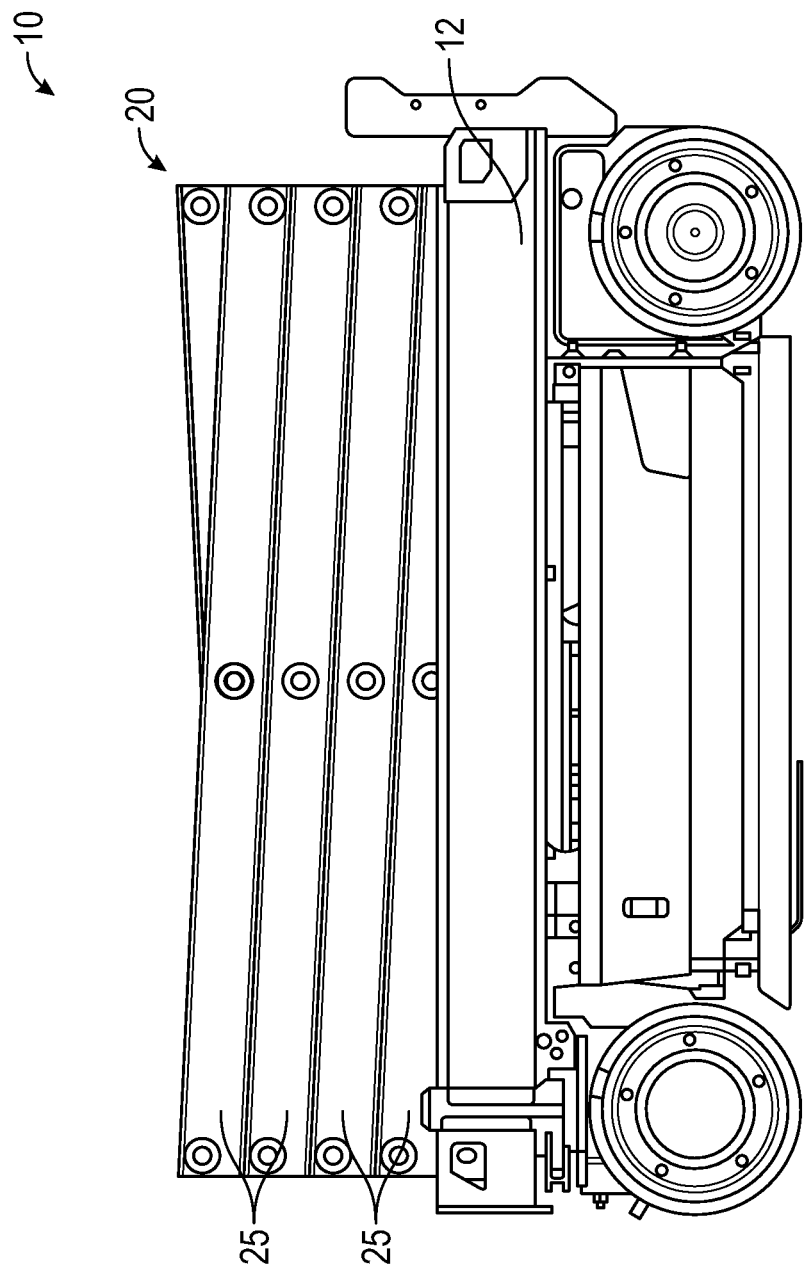
FIG. 2A is a side view of the lift device of FIG. 1A, shown in a retracted or stowed position.

The vehicle 10 further includes a retractable lift mechanism, shown as a scissor lift mechanism 20, coupled to the base 12. The scissor lift mechanism 20 supports a work platform 22 (shown in FIG. 3). As depicted, a first end 23 of the scissor lift mechanism 20 is anchored to the base 12, while a second end 24 of the scissor lift mechanism 20 supports the work platform 22. As illustrated, the scissor lift mechanism 20 is formed of a foldable series of linked support members 25. The scissor lift mechanism 20 is selectively movable between a retracted or stowed position (shown in FIG. 2A) and a deployed or work position (shown in FIG. 2B) using an actuator, shown as linear actuator 26. The linear actuator 26 is an electric actuator. The linear actuator 26 controls the orientation of the scissor lift mechanism 20 by selectively applying force to the scissor lift mechanism 20. When a sufficient force is applied to the scissor lift mechanism 20 by the linear actuator 26, the scissor lift mechanism 20 unfolds or otherwise deploys from the stowed or retracted position into the work position. Because the work platform 22 is coupled to the scissor lift mechanism 20, the work platform 22 is also raised away from the base 12 in response to the deployment of the scissor lift mechanism 20.

Figure 3:
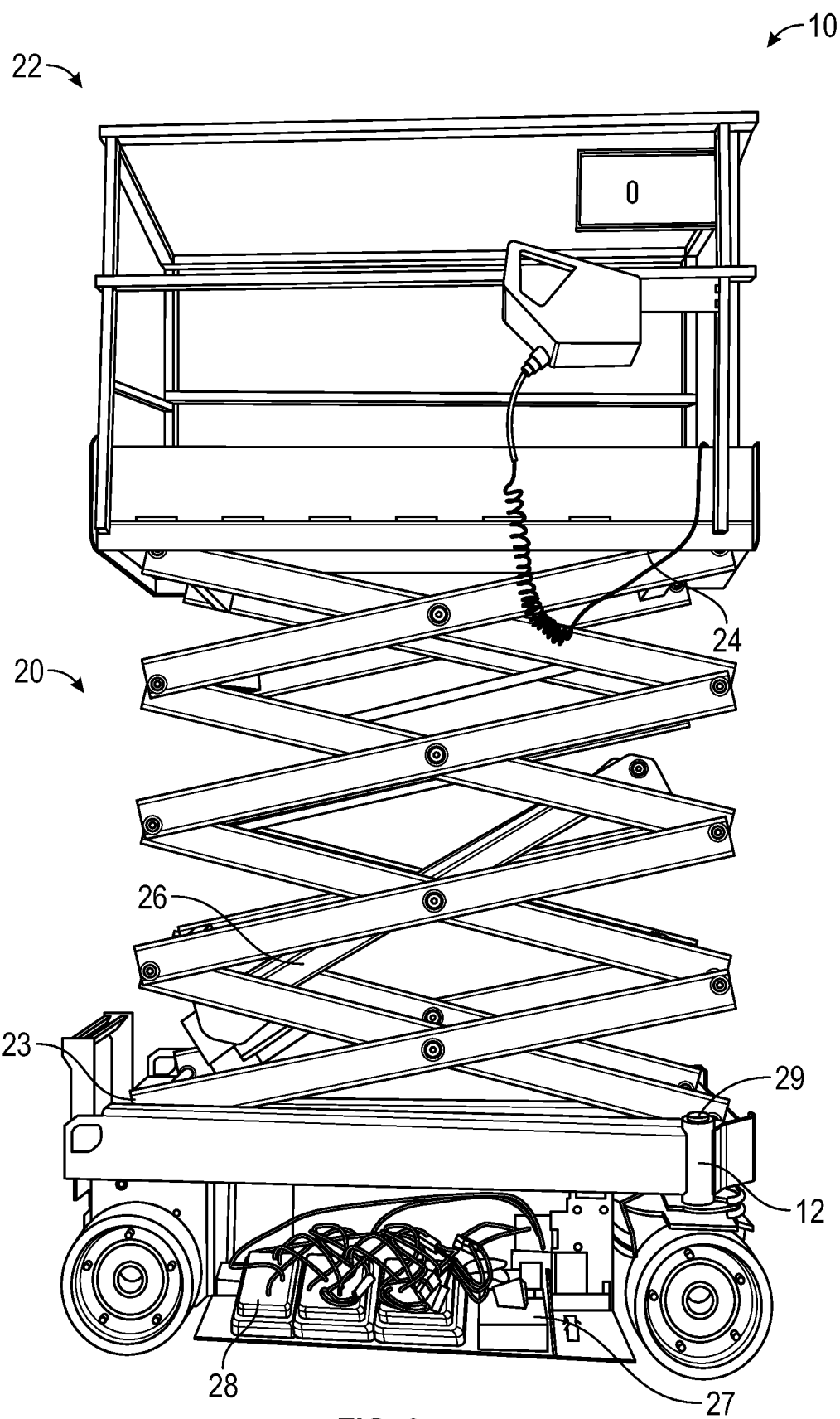
FIG. 3 is a side view of the lift device of FIG. 1A, depicting various vehicle controllers.

As shown in FIG. 3, the vehicle 10 further includes a vehicle controller 27 and a lift controller 28. The vehicle controller 27 is in communication with the lift controller 28. The lift controller 28 is in communication with the linear actuator 26 to control the movement of the scissor lift mechanism 20. Communication between the lift controller 28 and the linear actuator 26 and/or between the vehicle controller 27 and the lift controller 28 can be provided through a hardwired connection, or through a wireless connection (e.g., Bluetooth, Internet, cloud-based communication system, etc.). It should be understood that each of the vehicle controller 27 and the lift controller 28 includes various processing and memory components configured to perform the various activities and methods described herein. For example, in some instances, each of the vehicle controller 27 and the lift controller 28 includes a processing circuit having a processor and a memory. The memory is configured to store various instructions configured to, when executed by the processor, cause the vehicle 10 to perform the various activities and methods described herein.

In some embodiments, the vehicle controller 27 may be configured to limit the drive speed of the vehicle 10 depending on a height of the work platform 22. That is, the lift controller 28 may be in communication with a scissor angle sensor 29 configured to monitor a lift angle of the bottommost support member 25 with respect to the base 12. Based on the lift angle, the lift controller 28 may determine the current height of the work platform 22. Using this height, the vehicle controller 27 may be configured to limit or proportionally reduce the drive speed of the vehicle 10 as the work platform 22 is raised.

Figure 2B:
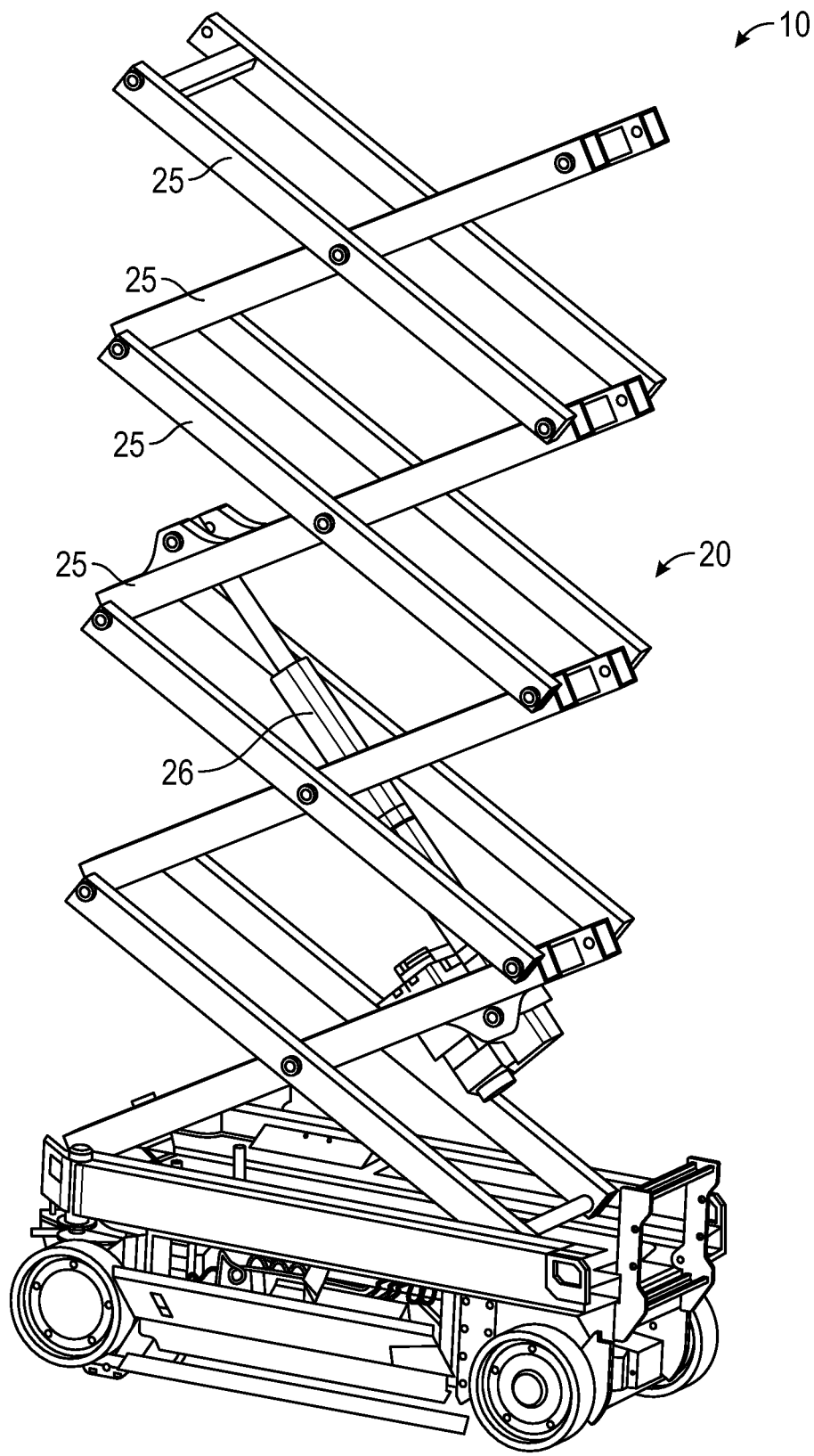
FIG. 2B is a side perspective view of the lift device of FIG. 1A, shown in an extended or work position.
Figure 4:
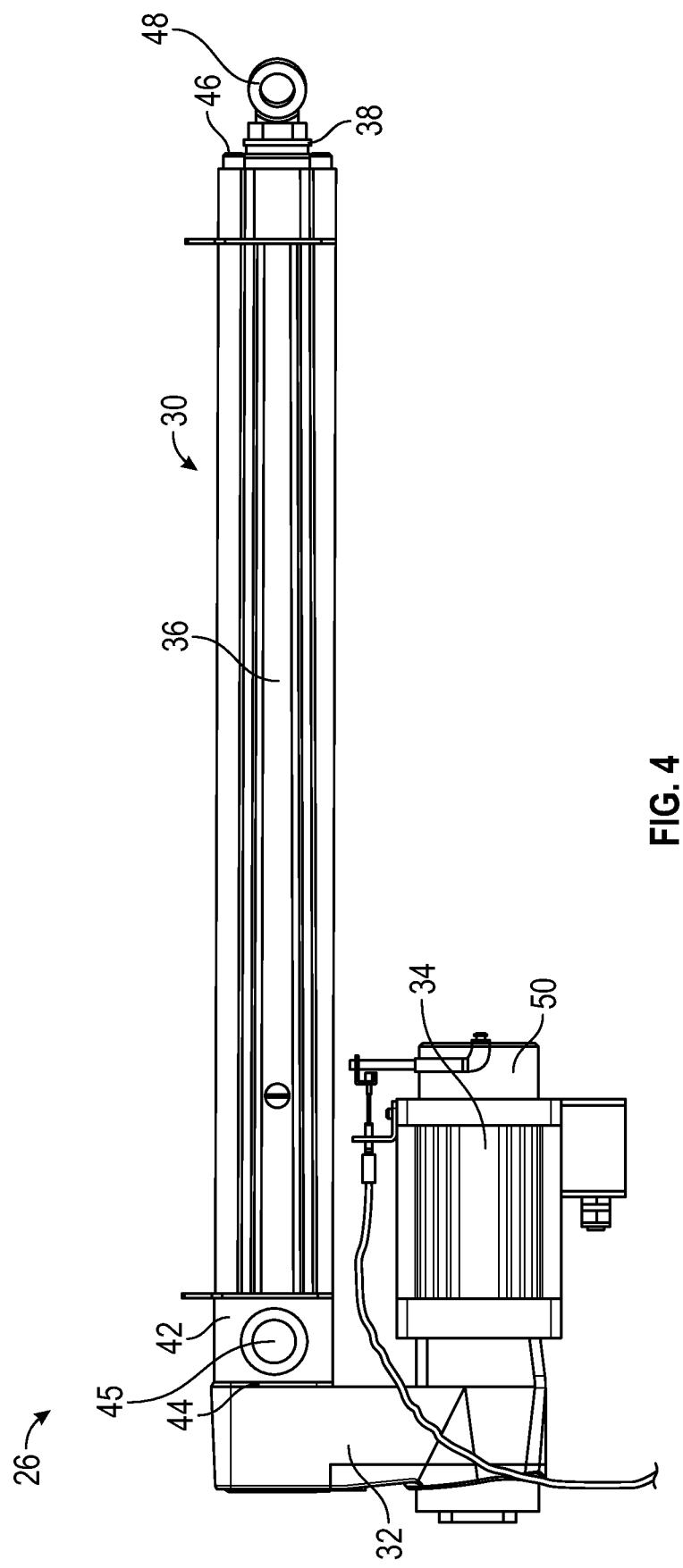
FIG. 4 is a side view of a linear actuator of the lift device of FIG. 1A.

As illustrated in the exemplary embodiment provided in FIGS. 4-6, the linear actuator 26 includes a push tube assembly 30, a gear box 32, and an electric lift motor 34. The push tube assembly 30 includes a protective outer tube 36 (shown in FIGS. 4 and 5), an inner push tube 38, and a nut assembly 40 (shown in FIG. 6). The protective outer tube 36 has a trunnion connection portion 42 disposed at a proximal end 44 thereof. The trunnion connection portion 42 is rigidly coupled to the gear box 32, thereby rigidly coupling the protective outer tube 36 to the gear box 32. The trunnion connection portion 42 further includes a trunnion mount 45 that is configured to rotatably couple the protective outer tube 36 to one of the support members 25 (as shown in FIG. 2B).

The protective outer tube 36 further includes an opening at a distal end 46 thereof. The opening of the protective outer tube 36 is configured to slidably receive the inner push tube 38. The inner push tube 38 includes a connection end, shown as trunnion mount 48, configured to rotatably couple the inner push tube 38 to another one of the support members 25 (as shown in FIG. 2B). As will be discussed below, the inner push tube 38 is slidably movable and selectively actuatable between an extended position (shown in FIG. 2B) and a retracted position (shown in FIG. 4).

Referring now to FIG. 6, the inner push tube 38 is rigidly coupled to the nut assembly 40, such that motion of the nut assembly 40 results in motion of the inner push tube 38. The inner push tube 38 and the nut assembly 40 envelop a central screw rod. The central screw rod is rotatably engaged with the gear box 32 and is configured to rotate within the inner push tube 38 and the nut assembly 40, about a central axis of the push tube assembly 30. The nut assembly 40 is configured to engage the central screw rod and translate the rotational motion of the central screw rod into translational motion of the inner push tube 38 and the nut assembly 40, with respect to the central screw rod, along the central axis of the push tube assembly 30.

Referring again to FIG. 4, the lift motor 34 is configured to selectively provide rotational actuation to the gear box 32. The rotational actuation from the lift motor 34 is then translated through the gear box 32 to selectively rotate the central screw rod of the push tube assembly 30. The rotation of the central screw rod is then translated by the nut assembly 40 to selectively translate the inner push tube 38 and the nut assembly 40 along the central axis of the push tube assembly 30. Accordingly, the lift motor 34 is configured to selectively actuate the inner push tube 38 between the extended position and the retracted position. Thus, with the trunnion mount 45 of the protective outer tube 36 and the trunnion mount 48 of the inner push tube 38 each rotatably coupled to their respective support members 25, the lift motor 34 is configured to selectively move the scissor lift mechanism 20 to various heights between and including the retracted or stowed position and the deployed or work position.

In some embodiments, the nut assembly 40 may be a ball screw nut assembly. In some other embodiments, the nut assembly 40 may be a roller screw nut assembly. In some yet some other embodiments, the nut assembly 40 may be any other suitable nut assembly configured to translate the rotational motion of the central screw rod into axial movement of the inner push tube 38 and the nut assembly 40.

When the lift motor 34 is powered down or discharged, the nut assembly 40 allows the scissor lift mechanism 20 to gradually retract due to gravity. As such, the lift motor 34 includes an electromagnetic brake 50 configured to maintain the position of the work platform 22 when the lift motor 34 is powered down or discharged. In some instances, the electromagnetic brake 50 is further configured to aid the lift motor 34 in maintaining the position of the work platform 22 during normal operation.

The lift motor 34 may be an AC motor (e.g., synchronous, asynchronous, etc.) or a DC motor (shunt, permanent magnet, series, etc.). In some instances, the lift motor 34 is in communication with and powered by the battery 16. In some other instances, the lift motor 34 may receive electrical power from another electricity source on board the vehicle 10.

In some embodiments, the linear actuator 26 includes various built-in sensors configured to monitor various actuator/motor characteristics. For example, the linear actuator 26 may include a motor speed sensor, a motor torque sensor (e.g., a motor current sensor), various temperature sensors, various vibration sensors, etc. The lift controller 28 may then be in communication with each of these sensors, and may use real-time information received/measured by the sensors to determine a load held by the work platform 22.

In some embodiments, to determine the load held by the work platform 22, the lift controller 28 may temporarily disengage the electromagnetic brake 50 and maintain the height of the work platform 22 using the lift motor 34. As alluded to above, in some instances, the electromagnetic brake 50 is configured to aid the lift motor in maintaining the position of the work platform 22 during normal operation. By disengaging the electromagnetic brake 50, the full load on the work platform 22 must be supported using the lift motor 34. With the full load on the work platform 22 being supported by the lift motor 34, the lift controller 28 may then determine, based on the various actuator/motor characteristics, the load on the work platform 22. In some instances, the electromagnetic brake 50 may be disengaged for less than five seconds. In some instances, the electromagnetic brake 50 may be disengaged for less than one second.

Figure 7:
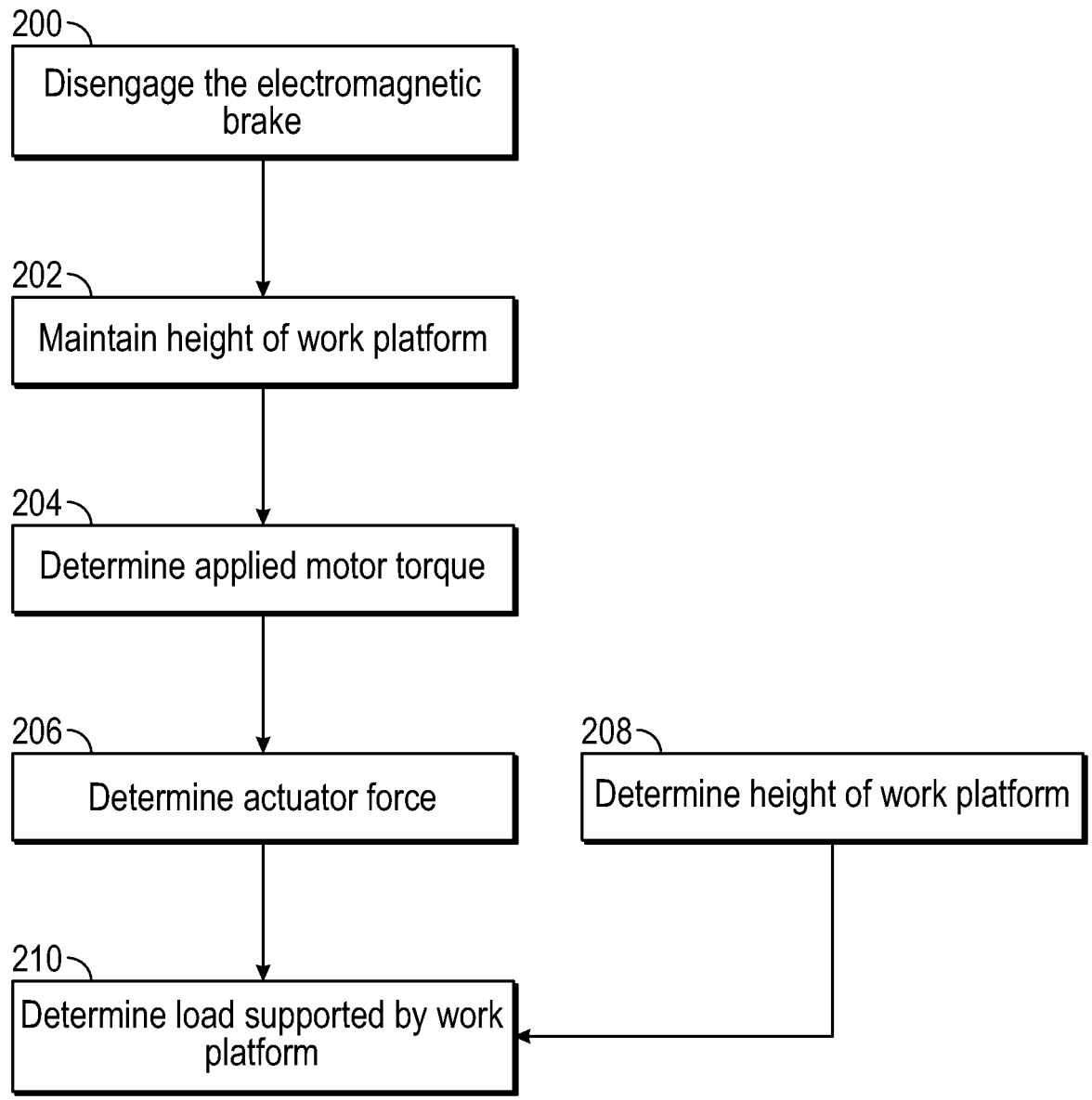
FIG. 7 is a flow chart of an exemplary method of determining a load supported by a work platform of the lift device of FIG. 3.

For example, referring now to FIG. 7, a flow chart is provided, showing an exemplary method of determining the load on the work platform 22. As depicted, the lift controller 28 may first disengage the electromagnetic brake 50, at step 200. The lift controller 28 may then maintain the height of the work platform 22 using the lift motor 34, at step 202.

With the electromagnetic brake 50 disengaged and the lift motor 34 maintaining the height of the work platform 22, the lift controller 28 may determine the applied motor torque output by the lift motor 34, at step 204, using a combination of the measured motor current of the lift motor 34, the measured motor slip of the lift motor 34, and various other motor characteristics associated with the lift motor 34 (e.g., motor type, winding density of a coil of the lift motor 34, winding material of the coil of the lift motor 34, etc.). The lift controller 28 may then use the applied motor torque and a model of the mechanics of the linear actuator 26 to determine an actuator force applied by the linear actuator 26 on the scissor lift mechanism 20, at step 206.

Before, during, or after determining the actuator force applied by the linear actuator 26, the lift controller 28 may determine a height of the work platform 22, at step 208, using the lift angle sensed by the scissor angle sensor 29 and a model of the mechanics of the scissor lift mechanism 20. The lift controller 28 may then determine the load supported by the work platform 22, at step 210, using the applied actuator force, the platform height, and a height-force curve for the scissor lift mechanism 20.

In some exemplary embodiments, a strain gauge 52 (shown in FIG. 6) may be coupled to the inner push tube 38 to monitor a compression of the inner push tube 38 during operation (e.g., along the axial length of the inner push tube). The lift controller 28 may be in communication with the strain gauge 52. Accordingly, the lift controller 28 may additionally or alternatively use the monitored compression of the inner push tube 38, various dimensional characteristics of the inner push tube 38 (e.g., length, diameter, thickness, etc.), and the material properties of the inner push tube 38 (e.g., Young's modulus) to determine the load supported by the inner push tube 38, and thereby the load supported by the work platform 22.

In some embodiments, the lift controller 28 may be configured to limit or scale the lifting functions of the scissor lift mechanism 20 based on the determined load supported by the work platform 22. For example, in some instances, the lift controller 28 may limit or scale the lifting functions when the load supported by the work platform is between 100% and 120% of a rated capacity of the vehicle 10. For example, between 100% and 120% of the rated capacity, the lift speed (raising or lowering) of the linear actuator 26 may be reduced (e.g., 20%, 50%, 75% of normal operation speed).

Referring again to FIGS. 1A and 1B, the battery 16 can also supply electrical power to a drive motor 54 to propel the vehicle 10. The drive motor 54 may similarly be an AC motor (e.g., synchronous, asynchronous, etc.) or a DC motor (shunt, permanent magnet, series, etc.) for example, which receives electrical power from the battery 16 or another electricity source on board the vehicle 10 and converts the electrical power into rotational energy in a drive shaft. The drive shaft can be used to drive the wheels 14A, 14B of the vehicle 10 using a transmission. The transmission can receive torque from the drive shaft and subsequently transmit the received torque to a rear axle 56 of the vehicle 10. Rotating the rear axle 56 also rotates the rear wheels 14A on the vehicle 10, which propels the vehicle 10.

The rear wheels 14A of the vehicle 10 can be used to drive the vehicle, while the front wheels 14B can be used to steer the vehicle 10. In some embodiments, the rear wheels 14A are rigidly coupled to the rear axle 56, and are held in a constant orientation relative to the base 12 of the vehicle 10 (e.g., approximately aligned with an outer perimeter 58 of the vehicle 10). In contrast, the front wheels 14B are pivotally coupled to the base 12 of the vehicle 10. The wheels 14B can be rotated relative to the base 12 to adjust a direction of travel for the vehicle 10. Specifically, the front wheels 14B can be oriented using an electrical steering system 60. In some embodiments, the steering system 60 may be completely electrical in nature, and may not include any form of hydraulics.

Figure 8:
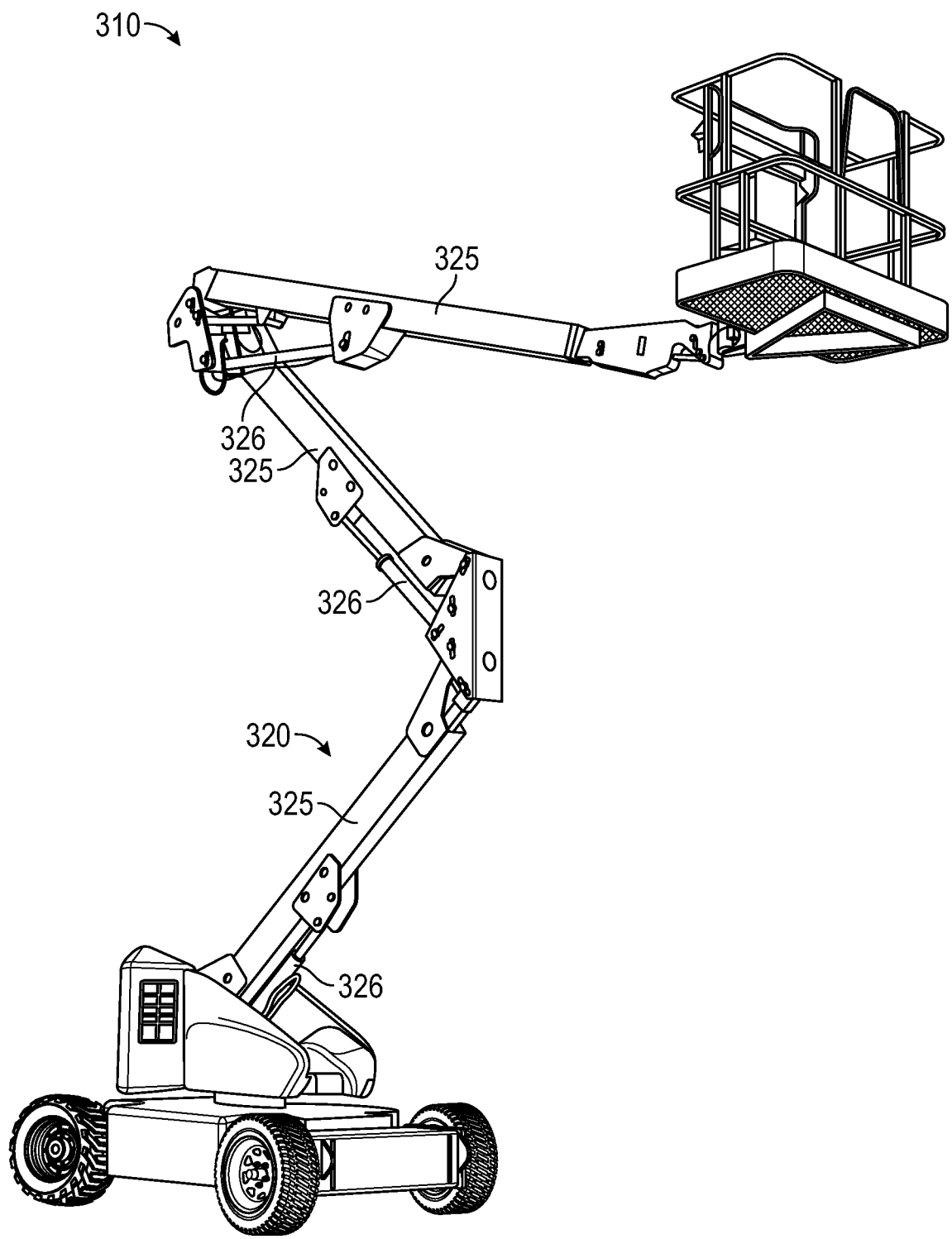
FIG. 8 is a side perspective view of another lift device in the form of a boom lift, according to another exemplary embodiment.

It should be appreciated that, while the retractable lift mechanism included on vehicle 10 is a scissor lift mechanism, in some instances, a vehicle may be provided that alternatively includes a retractable lift mechanism in the form of a boom lift mechanism. For example, in the exemplary embodiment depicted in FIG. 8, a vehicle, shown as vehicle 310, is illustrated. The vehicle 310 includes a retractable lift mechanism, shown as boom lift mechanism 320. The boom lift mechanism 320 is similarly formed of a foldable series of linked support members 325. The boom lift mechanism 320 is selectively movable between a retracted or stowed position and a deployed or work position using a plurality of actuators 326. Each of the plurality of actuators 326 is a linear actuator similar to the linear actuator 26.

It should be further appreciated that the linear actuators 26, 326 used in the lift mechanisms 20, 320, as well as in the steering system 60, may be incorporated into nearly any type of electric vehicle. For example, the electric systems described herein can be incorporated into, for example, a scissor lift, an articulated boom, a telescopic boom, or any other type of aerial work platform.

Advantageously, vehicles 10, 310 may be fully-electric lift devices. All of the electric actuators and electric motors of vehicles 10, 310 can be configured to perform their respective operations without requiring any hydraulic systems, hydraulic reservoir tanks, hydraulic fluids, engine systems, etc. That is, both vehicles 10, 310 may be completely devoid of any hydraulic systems and/or hydraulic fluids generally. Said differently, both vehicles 10, 310 may be devoid of any moving fluids. Traditional lift device vehicles do not use a fully-electric system and require regular maintenance to ensure that the various hydraulic systems are operating properly. As such, the vehicles 10, 310 may use electric motors and electric actuators, which allows for the absence of combustible fuels (e.g., gasoline, diesel) and/or hydraulic fluids. As such, the vehicles 10, 310 may be powered by batteries, such as battery 16, that can be recharged when necessary.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is coupled to the processor to form a processing circuit and includes computer code for executing (e.g., by the processor) the one or more processes described herein.

It is important to note that the construction and arrangement of the vehicle as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A method for determining a load supported by a work platform of a lift device, the method comprising:
   providing the lift device including the work platform and a linear actuator configured to support and selectively move the work platform between a raised and a lowered position, the linear actuator having an electric motor and an electromagnetic brake;
   disengaging the electromagnetic brake of the linear actuator;
   maintaining a height of the work platform using the electric motor of the linear actuator;
   determining a motor torque applied by the electric motor;
   determining an actuator force applied by the linear actuator to the work platform based on the motor torque applied by the electric motor;
   determining the height of the work platform; and
   determining the load supported by the work platform based on the actuator force applied to the work platform and the height of the work platform,
   wherein the motor torque is determined based on at least one of a measured motor current of the electric motor, a measured motor slip of the electric motor, a motor type of the electric motor, a winding density of a coil of the electric motor, and a winding material of the coil of the electric motor,
   wherein the lift device is a scissor lift having a foldable series of linked support members and the height of the work platform is determined based on a lift angle of at least one linked support member,
   wherein the load supported by the work platform is determined at least partially based on a height-force curve for the lift device, and
   wherein the linear actuator includes a push tube assembly having a protective outer tube and an inner push tube and the load supported by the work platform is further determined based on a monitored compression of the inner push tube.

2. The method of claim 1, further comprising;
   limiting a lift speed of the linear actuator based on the determined load supported by the work platform.

3. The method of claim 2, wherein the lift speed is limited to 50% of normal operation speed when the load supported by the work platform is between 100% and 120% of a rated capacity of the lift device.

4. The method of claim 1, further comprising:
   limiting a drive speed of the lift device based on the height of the work platform.

5. A lift device comprising:
   a base having a plurality of wheels;
   a retractable lift mechanism having a first end coupled to the base and being moveable between an extended position and a retracted position;
   a work platform configured to support a load, the work platform coupled to and supported by a second end of the retractable lift mechanism;
   a linear actuator configured to selectively move the retractable lift mechanism between the extended position and the retracted position, the linear actuator having an electric motor and an electromagnetic brake, the electromagnetic brake configured to, when engaged, prevent the linear actuator from moving the retractable lift mechanism between the extended position and the retracted position; and
   a lift controller in communication with the linear actuator and including a processing circuit having a processor and a memory, the memory having instructions configured to, when executed by the processor, cause the lift controller to:
   disengage the electromagnetic brake;
   maintain a height of the work platform using the electric motor;
   determine a motor torque applied by the electric motor;
   determine an actuator force applied to the work platform based on the motor torque applied by the electric motor;
   determine the height of the work platform; and
   determine the load supported by the work platform based on the actuator force applied to the work platform and the height of the work platform,
   wherein linear actuator includes a motor speed sensor and a motor current sensor, and the motor torque is determined based on at least one of a measured motor current of the electric motor, a measured motor slip of the electric motor, a motor type of the electric motor, a winding density of a coil of the electric motor, and a winding material of the coil of the electric motor, wherein the retractable lift mechanism is a scissor lift mechanism having a foldable series of linked support members, at least one linked support member of the foldable series of linked support members includes an angle sensor configured to monitor a lift angle of the at least one linked support member, and the height of the work platform is determined based on the lift angle of the at least one linked support member, and wherein the linear actuator includes a push tube assembly having a protective outer tube and an inner push tube, the inner push tube includes a strain gauge configured to monitor a compression of the inner push tube, and the load supported by the work platform is further determined based on the monitored compression of the inner push tube.

6. The lift device of claim 5, wherein the instructions are further configured to, when executed by the processor, cause the lift controller to:

limit a lift speed of the linear actuator based on the determined load supported by the work platform.

7. The lift device of claim 5, wherein the electromagnetic brake is further configured to maintain the position of the work platform when the electric motor of the linear actuator is powered down or discharged.

8. The lift device of claim 5, wherein the retractable lift mechanism is a boom lift mechanism.

9. The lift device of claim 5, wherein the lift device is devoid of hydraulic systems.

10. A fully-electric scissor lift comprising:

a base having a plurality of wheels;

a scissor lift mechanism having a first end coupled to the base and being moveable between an extended position and a retracted position;

a work platform configured to support a load, the work platform coupled to and supported by a second end of the scissor lift mechanism;

a linear actuator configured to selectively move the scissor lift mechanism between the extended position and the retracted position, the linear actuator having an electric motor, an electromagnetic brake, and a push tube assembly, the electromagnetic brake configured to, when engaged, prevent the linear actuator from moving the scissor lift mechanism between the extended position and the retracted position, the push tube assembly having a protective outer tube and an inner push tube, the inner push tube including a strain gauge configured to monitor a compression of the inner push tube; and a lift controller in communication with the linear actuator and including a processing circuit having a processor and a memory, the memory having instructions configured to, when executed by the processor, cause the lift controller to:

disengage the electromagnetic brake;

maintain a height of the work platform using the electric motor;

determine a motor torque applied by the electric motor;

determine an actuator force applied to the work platform based on the motor torque applied by the electric motor;

determine the height of the work platform; and determine the load supported by the work platform based on the actuator force applied to the work platform, the monitored compression of the inner push tube, and the height of the work platform.

11. The fully-electric scissor lift of claim 10, wherein the scissor lift mechanism includes a foldable series of linked support members, at least one linked support member of the foldable series of linked support members includes an angle sensor configured to monitor a lift angle of the at least one linked support member, and the height of the work platform is determined based on the lift angle of the at least one linked support member.

12. The fully-electric scissor lift of claim 11, wherein the instructions are further configured to, when executed by the processor, cause the lift controller to:

limit a lift speed of the linear actuator based on the determined load supported by the work platform.

13. The fully-electric scissor lift of claim 12, wherein the motor torque is determined based on at least one of a measured motor current of the electric motor, a measured motor slip of the electric motor, a motor type of the electric motor, a winding density of a coil of the electric motor, and a winding material of the coil of the electric motor.

* * * * *